INVENTOR.
GEORGE BAECHLI
BY
ATTORNEY

INVENTOR.
GEORGE BAECHLI
ATTORNEY

INVENTOR.
GEORGE BAECHLI

Dec. 6, 1966 G. BAECHLI 3,289,816
EXTENDIBLE CONVEYOR
Filed Sept. 28, 1965 10 Sheets-Sheet 8

INVENTOR.
GEORGE BAECHLI
BY
ATTORNEY

INVENTOR.
GEORGE BAECHLI
BY
ATTORNEY

Dec. 6, 1966   G. BAECHLI   3,289,816
EXTENDIBLE CONVEYOR
Filed Sept. 28, 1965   10 Sheets-Sheet 10

INVENTOR.
GEORGE BAECHLI
BY
ATTORNEY

United States Patent Office 3,289,816
Patented Dec. 6, 1966

3,289,816
EXTENDIBLE CONVEYOR
George Baechli, New Philadelphia, Ohio, assignor to Lee-Norse Company, Charleroi, Pa., a corporation of Delaware
Filed Sept. 28, 1965, Ser. No. 490,785
13 Claims. (Cl. 198—139)

This application is a continuation-in-part of my application, Serial No. 411,907, which was filed November 17, 1964, now abandoned.

The present invention relates to conveyors and, more particularly, to a portable extendible belt conveyor for conveying disintegrated material, such as coal and other minerals, from a continuous miner to the main conveying system of a mine. Conventionally, belt conveyors for carrying disintegrated material, such as coal and other minerals, have generally been limited to two basic types. That is, they either have employed conveyor-belt supporting idlers mounted upon a floor-mounted shield pan to support the endless conveyor belt or, alternatively, they have utilized wire ropes supported by floor-mounted stands or roof anchor bolts to carry the conveyor-belt supporting idlers. Both of these types of conveyors were undesirable in that they could not be easily and simply extended or retracted to follow the mining apparatus that they accompanied. The latter of these conveyor types, furthermore, was disadvantageous in that it required the employment of horizontal spreaders for laterally stretching the endless conveyor belt.

Recently, an extendible conveyor has been developed which does permit the effective length of the endless conveyor belt to be extended or retracted to follow the accompanied mining apparatus. This extensible conveyor employs two individually powered vehicles to support the opposing ends of the endless conveyor belt and, upon relative movement of the two vehicles, adjusts the effective length of the endless belt by varying the length thereof stored upon a storage apparatus carried by one of the vehicles. It has been found, however, that this extensible conveyor is disadvantageous and undesirable in that it requires a separate power unit for each of the vehicles and, hence, a separate operator for each of the vehicles. Furthermore, as a result of this use of two separate vehicles to support the endless belt, the length of the conveyor, even with the endless belt in extreme retracted position, is such that it is extremely difficult and troublesome to turn a corner with the conveyor. In addition, the relatively short length of endless belt which may be carried by this conveyor necessitates the shutting down of the conveyor during the extension and retraction of the endless belt such that additional belt may be, respectively, added and subtracted from the length thereof normally carried by the conveyor.

An object of the present invention is to provide a new and improved extendible conveyor which requires a power unit for only one of the conveyor-belt supporting units and, with the conveyor belt in retracted position, forms a rigid, compact conveying bridge which is readily maneuverable to follow the continuous miner throughout its movements.

Another object of the invention is to provide a new and improved extendible conveyor of the type set forth which locates the power unit adjacent its head end to facilitate the maneuverability of the conveyor and enable the slack side of the conveyor belt to carry the coal or other minerals mined by the continuous miner.

Another object is to provide a new and improved extendible conveyor of the type set forth which supports conveyor-belt supporting stands intermediate the conveyor-belt supporting units for guiding and carrying the conveyor belt intermediate the supporting units when the conveyor belt is in extended position.

The aforesaid objects of the present invention, and other objects thereof which will become apparent from the following description, are accomplished by providing an extendible belt conveyor which includes a supporting frame having a head section and a tail section. The head section of the conveyor is supported by traction means and is movable thereby. The tail section of the conveyor is connected to the head section for movement therewith, and is detachable from the head section to allow movement of the head section relative to the tail section. The head section and the tail section each carry guide means for guiding an endless conveyor belt which longitudinally connects the head and tail sections; and the head section includes a storage means for storing a portion of an endless belt and varying the effective length thereof upon movement of the head section relative to the tail section. An endless belt is disposed longitudinally between the head section and the tail section for movement thereto and is guided by the guide means and is on the storage means to be variable in effective length upon movement of the head section relative to the tail section. The drive means for propelling the traction means and driving the endless belt is located upon the head section as a result of which the coal or other minerals conveyed by the conveyor are carried by the slack side of the endless belt.

Referring to the drawings wherein similar reference characters designate corresponding parts throughout the several views.

Referring more particularly to the drawings wherein similar reference characters designate corresponding parts throughout the several views, the illustrated extendible conveyor 10 comprises a supporting frame having an elongated, head or loading section 12 (FIGS. 1, 1B, 2) and a tail or discharge section 20 (FIGS. 1, 1A, 2A, 5, 6). The head section 12 is pivotally connected at its head end at 148 (FIG. 2) to a loading hopper 146 (FIGS. 1, 2) which is pivotable relative to the head section 12 by a plurality of double-acting hydraulic jacks 150 (FIGS. 1, 2, 7) connected intermediate the loading hopper 146 and the head section 12. The head section 12 carries a crawler frame 14 (FIG. 1B) upon each of its opposing sides 16 (FIG. 1B) and is supported and longitudinally movable by traction means such as the crawlers 26 (FIG. 2) which are located within the crawler frames 14.

The tail section 20 is detachably securable to the tail end of the head section 12 by a plurality of mounting pins 22 (FIG. 1A) which are receivable in openings 24 (FIG. 1) disposed in the head section 12. In the extreme retracted position of the conveyor 10, the tail section 20 is carried by the head section 12 to form a unitary, rigid, compact conveying bridge. The formation of this compact conveying bridge provides conjoined longitudinal movement of the head section 12 and the tail section 20 and facilitates tramming and maneuvering of the conveyor 10 to follow the continuous miner which it accompanies. When the conveyor 10 is extended, as illustrated in FIGS. 1, 1A, 2, and 2A, the tail section 20 is detached from the head section 12 to permit independent longitudinal movement of the head section 12. An anchor means, such as the anchor jacks 28 (FIGS. 1A, 2A) is provided for preventing movement of the tail section 20 when the latter is detached from the head section 12. The anchor jacks 28, as shown in FIG. 2A, each extend through the tail section 20 in abutting relationship with the roof 30 (FIG. 2A) and the floor 32 (FIG. 2A) of the mine and are each locked to the tail section 12 by a clamp 34 (FIGS. 1A, 2A).

An endless conveyor belt 52 (FIGS. 1, 1A, 1B, 2, 2A, 3, 4, 4A) longitudinally connects the head section 12 with the tail section 20 and extends into the loading hopper 146 which is carried by the head section 12. The endless conveyor belt 52 is longitudinally movable relative to the head section 12, the tail section 20, and the loading hopper 146 to transport disintegrated material deposited in the loading hopper 146 to the tail section 20.

Figure 1:
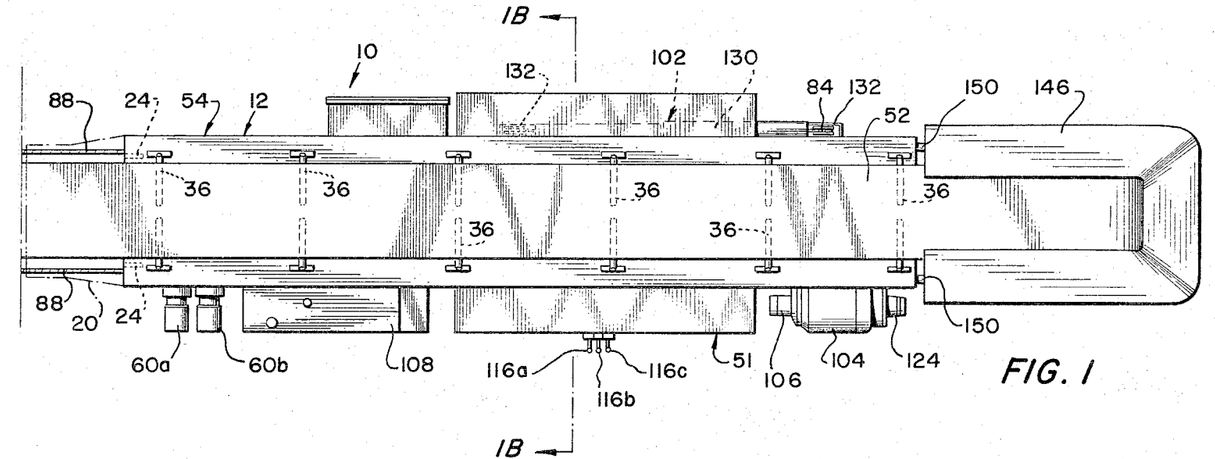
FIGS. 1 and 1A, taken together, provide a longitudinal view of the extendible conveyor of the present invention with the endless belt in extended position.
Figure 1A:
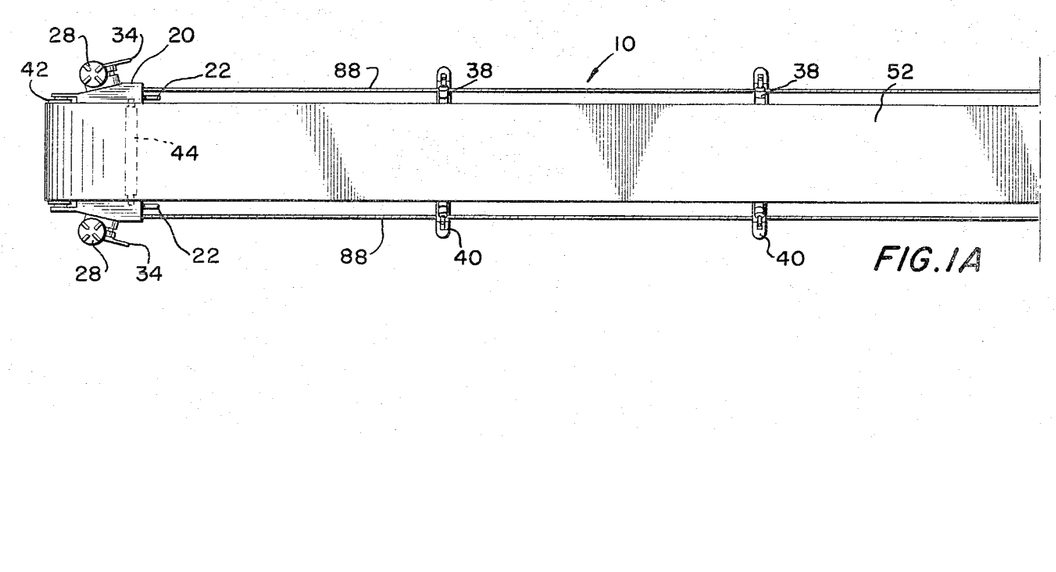
Figure 1B:
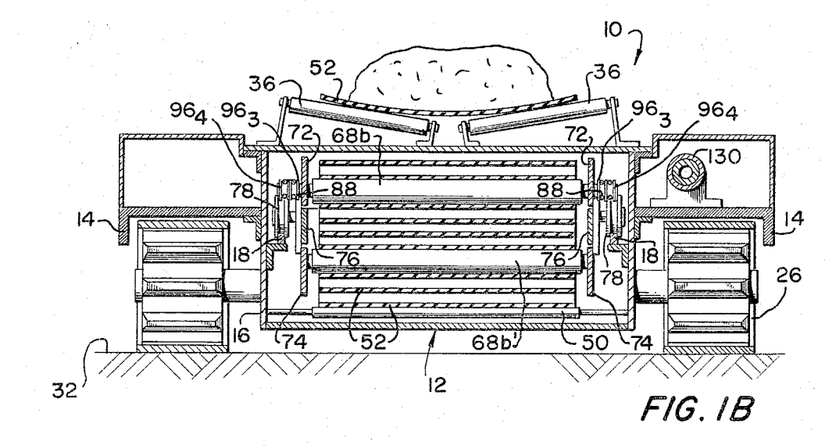
FIG. 1B is a sectional view taken on line 1B—1B of FIG. 1, looking in the direction of the arrows.
Figure 2:
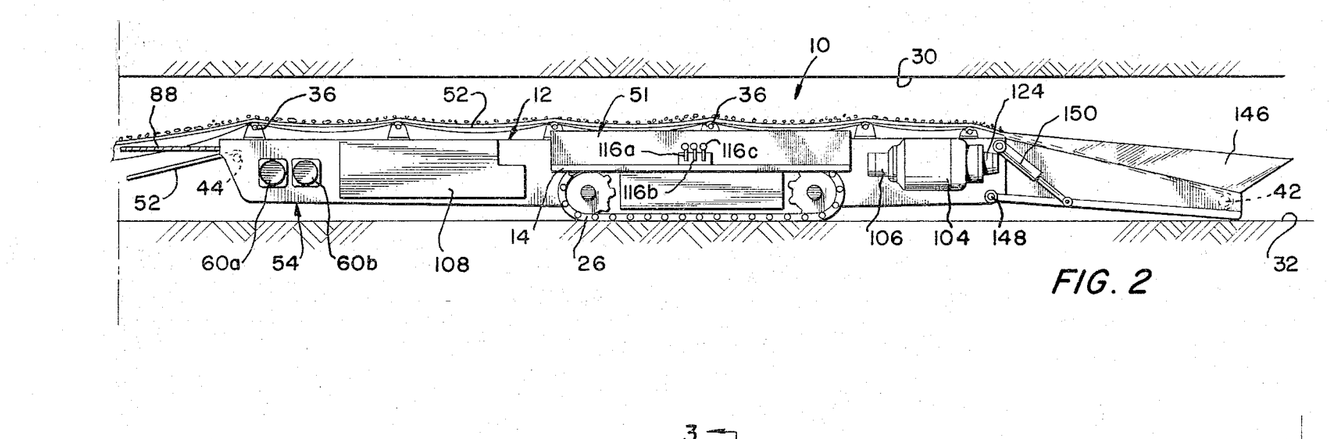
FIGS. 2 and 2A, taken together, provide an elevational view of the conveyor with the endless belt in extended position.
Figure 2A:
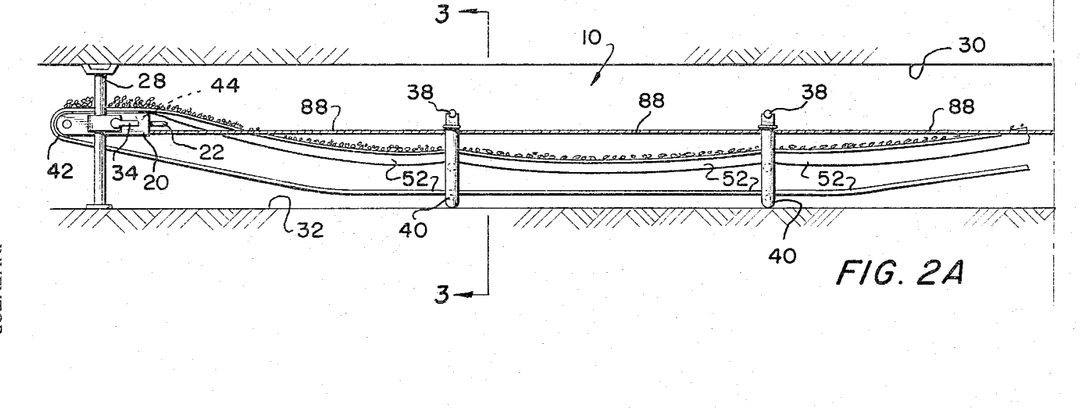
Figure 3:
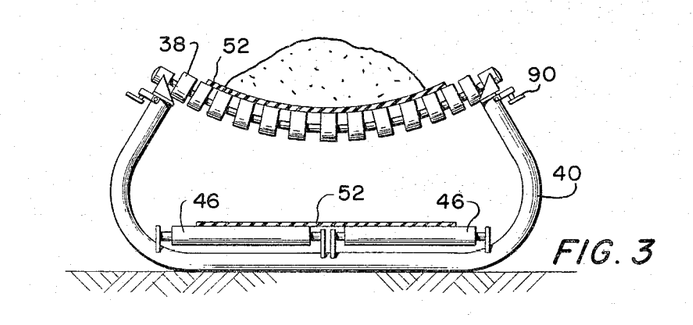
FIG. 3 is a sectional view taken on line 3—3 of FIG 2A, looking in the direction of the arrows, and illustrates one of the conveyor belt supporting stands.
Figure 4:
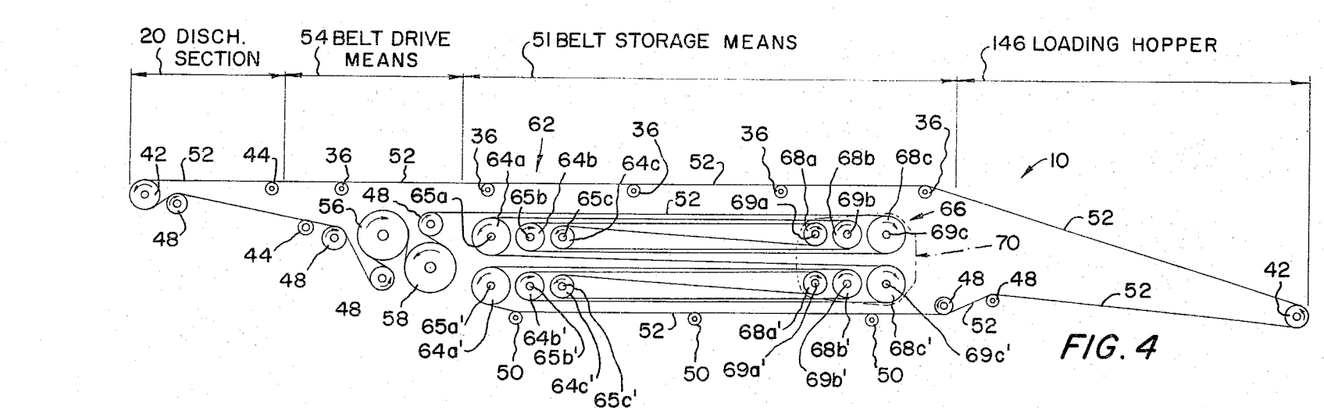
FIG. 4 is a diagrammatic view of the endless belt carried by the conveyor and illustrates such in retracted position.

The endless conveyor belt 52 is longitudinally driven by the belt drive means 54 which, as shown in FIG. 4, comprises a primary driving roll 56 and a secondary driving roll 58 driven, respectively, by the hydraulic motors 60a and 60b (FIGS. 1, 2). The primary driving roll 56 and the secondary driving roll 58 are carried by the head section 12 in spaced relationship to the end of the endless conveyor belt 52 carried by the tail section 20 such that the side of the endless conveyor belt 52 carrying disintegrated material is the slack side thereof. It will be seen that, as the conveyor 10 extends, the distance between the primary and secondary driving rolls 56 and 58, respectively, and the end of the endless conveyor belt 52 carried by the tail section 20 increases thereby increasing the slack in the side of the endless conveyor belt 52 carrying the disintegrated material. However, it will be understood that the primary and secondary driving rolls 56 and 58 are located upon the head section 12 in sufficiently spaced relationship to the tail section 20 to ensure slack in the side of the endless conveyor belt 52 carrying the disintegrated material even with the conveyor 10 in extreme retracted position.

A guide means is provided for aligning and guiding the endless conveyor belt 52 during the longitudinal movement thereof. The guide means comprises a plurality of troughing idlers 36 (FIGS. 1, 1B, 2, 4) carried by the upper surface of the head section 12, and end idler 42 (FIGS. 1A, 2, 2A, 4) carried by each of the tail section 20 and the loading hopper 146, a pivotable training idler 44 (FIGS. 1A, 2A, 4) carried by each of the tail section 20 and the head section 12, a snubber 48 (FIG. 4) carried by the tail section 20, and a plurality of snubbers 48 (FIGS. 4, 5, 6) and return rollers 50 (FIG. 4) supported by the head section 12. The endless conveyor belt 52 is aligned and guided intermediate the head section 12 and the tail section 20, with the conveyor 10 in an extended position, by a plurality of troughing idlers 38 (FIGS. 1A, 2, 3) and a plurality of idler rollers 46 (FIG. 3) carried by ground mounted, supporting stands 40 (FIGS. 1A, 2A, 3) manually inserted between the head section 12 and the tail section 20.

The supporting stands 40 are positioned and detachably supported by a plurality of ropes 88 (FIGS. 1, 1A, 1B, 2, 2A) which are each connected between a rope storage means 86 (FIGS. 5, 6) carried by the head section 12 and an anchor member 100 located on the tail section 20. The ropes 88 are each detachably connected to the supporting stands 40 by clamps 90 carried by the supporting stands 40. The ropes 88, as will be hereinafter more specifically disclosed, are adapted to be automatically extended and retracted from the head section 12 during the extension and retraction, respectively, of the conveyor 10. The ropes 88 are maintained taut throughout their extension and retraction by the rope storage means 86 and, due to this tautness, maintain the supporting stands 40 in an upright position.

Figure 4A:
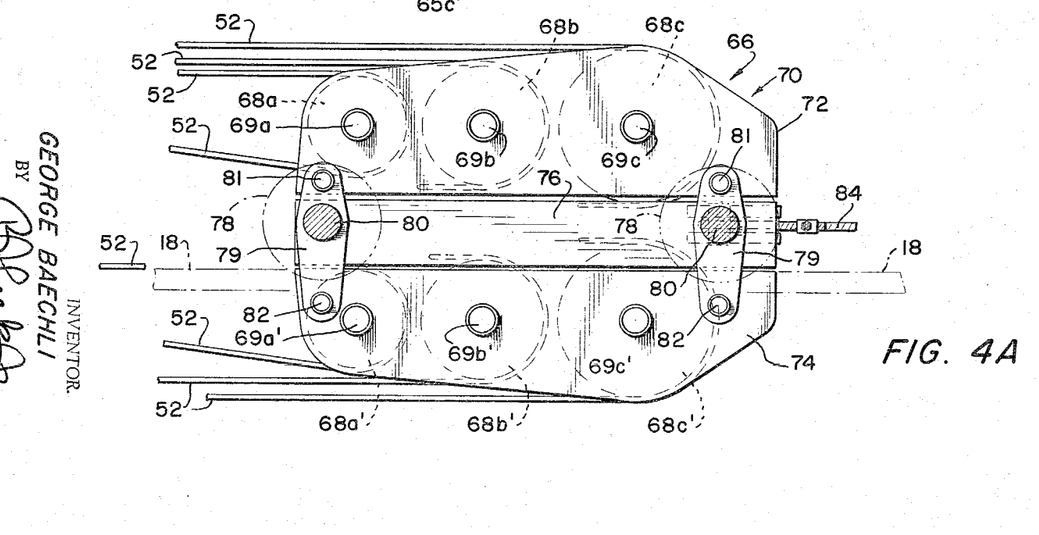
FIG. 4A is an enlarged, fragmentary elevational view of the storage means carried by the conveyor for varying the effective length of the endless belt.

A belt storage means 51 (FIGS. 1, 2, 4) is carried by the head section 12 for automatically adjusting the effective length of the endless conveyor belt 52 during the extension and retraction of the conveyor 10. The belt storage means 51 is aligned with the guide means and stores a portion of the endless conveyor belt 52 when the conveyor 10 is in other than extreme extended position. As shown in FIG. 4A, the belt storage means 51 comprises a stationary roller bank 62 and a movable roller bank 66. The stationary roller bank 62 comprises a first cluster of rollers 64a, 64b, and 64c and a second cluster of rollers 64a', 64b', and 64c'. The rollers 64a, 64b, and 64c are carried by the shafts 65a, 65b, and 65c, respectively, which are rotatably supported by the head section 12 and are rotatable with such shafts. The rollers 64a', 64b', and 64c', similarly, are carried by the shafts 65a', 65b', and 65c', respectively, which are rotatably supported by the head section for rotation with their respective shafts.

The movable roller bank 66 comprises a first cluster of rollers 68a, 68b, and 68c and a second cluster of rollers 68a', 68b', and 68c'. The rollers 68a, 68b, 68c, respectively, are carried by rotatably mounted shafts 69a, 69b, and 69c for rotation therewith. The rollers 68a', 68b', and 68c', similarly, are disposed upon rotatably mounted shafts 69a', 69b', and 69c', respectively, for rotation therewith. The shafts supporting the movable roller bank 66 are carried by a carriage 70 which is supported by a plurality of shafts 80 carrying carriage wheels 78 movable upon wheel tracks 18 extending longitudinally on the inside of each side 16 of the head section 12.

The carriage 70, as shown in FIG. 4A, is formed from a center supporting member 76 and a plaurality of upper and lower supporting members 72 and 74, respectively. The center supporting member 76 is supported by the shafts 80 which carry the carriage wheels 78; the upper and lower supporting members 72 and 74 directly support the shafts carrying the movable roller bank 66. The upper and lower supporting members 72 and 74 are connected to each other and to the center supporting member 76 by a plurality of differential levers 79 located upon each side of the carriage 70. The differential levers 79 are pivotally connected to the shafts 80 which support the center supporting member 76 and fixedly connected by the pins 81 and 82 to the upper and lower supporting members 72 and 74, respectively, to effect relative swinging movement of the upper and lower supporting members 72 and 74 in accordance with the direction of movement of the endless conveyor belt 52. The differential levers 79 thus provide tension on the endless conveyor belt 52 to control the slack therein during initial longitudinal movement of the endless conveyor belt 52 and maintain such slack within permissible limits. The carriage 70 is connected by a jack rope 84 to a single-action hydraulic jack 130 (FIG. 7) to be longitudinally moved thereby during retraction of the conveyor 10 and is longitudinally moved during extension of the conveyor 10 by the action of the endless conveyor belt 52 as it increases in effective length.

Figure 5:
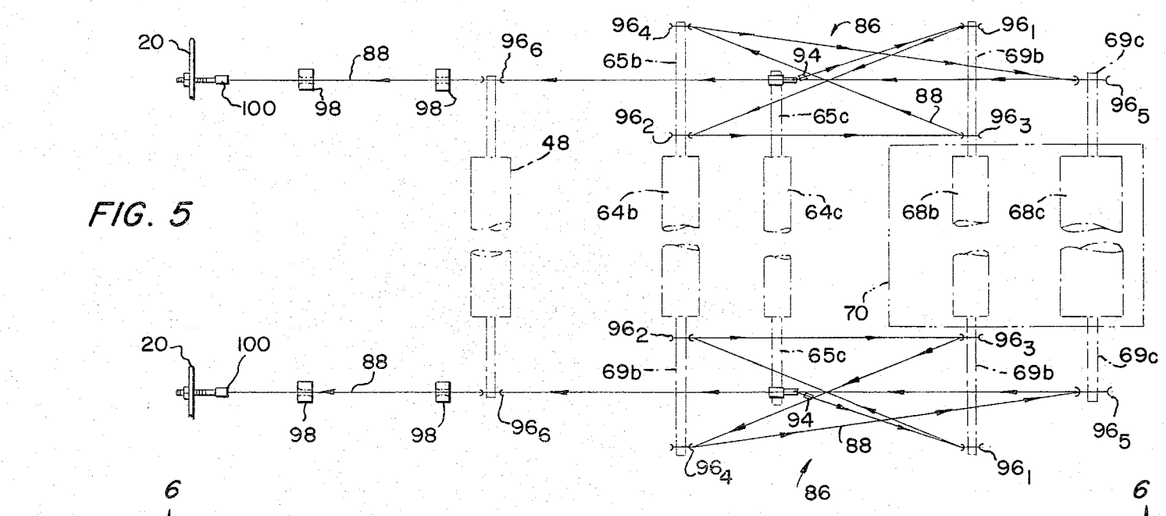
FIG. 5 is a longitudinal, diagrammatic view of rope means provided by the present invention for supporting the conveyor belt supporting stands.
Figure 6:
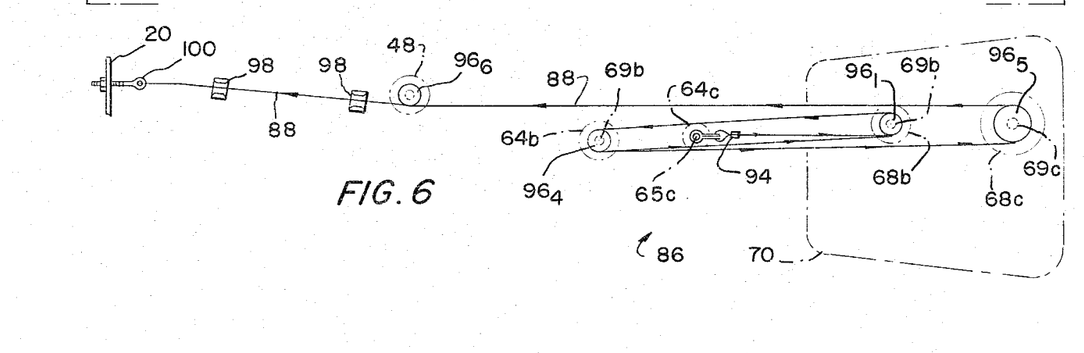
FIG. 6 is an elevational diagrammatic view of the rope means illustrated in FIG. 5.

The rope storage means 86 for storing the ropes 88 which carry the supporting stands 40 is carried by the conveyor 10 such that the ropes 88 are automatically extended and retracted from the head section 12 as the endless conveyor belt 52 is automatically extended and retracted, respectively, by the belt storage means 51. More specifically, as shown in FIGS. 5 and 6, the ropes 88 are anchored by clamps 94 to the opposing ends of the shaft 65c and pass successively around sheaves $96_1$ carried by the shaft 69b, sheaves $96_2$ carried by the shaft 65b, sheaves $96_3$ upon the shaft 69b, sheaves $96_4$ upon the shaft 65b, and sheaves $96_5$ on the shaft 69c. The ropes 88 then extend under the sheaves $96_6$ and pass through the bell mouths 98 intermediate their connection of the anchor member 100 on the tail section 20 and the shafts supporting the belt storage means 51. From the foregoing, it will be seen that the ropes 88 are maintained sufficiently taut to support the supporting stands 40 during the extension of the conveyor 10 and are maintained within the head section 12 when the conveyor 10 is in extreme retracted position.

Figure 7:
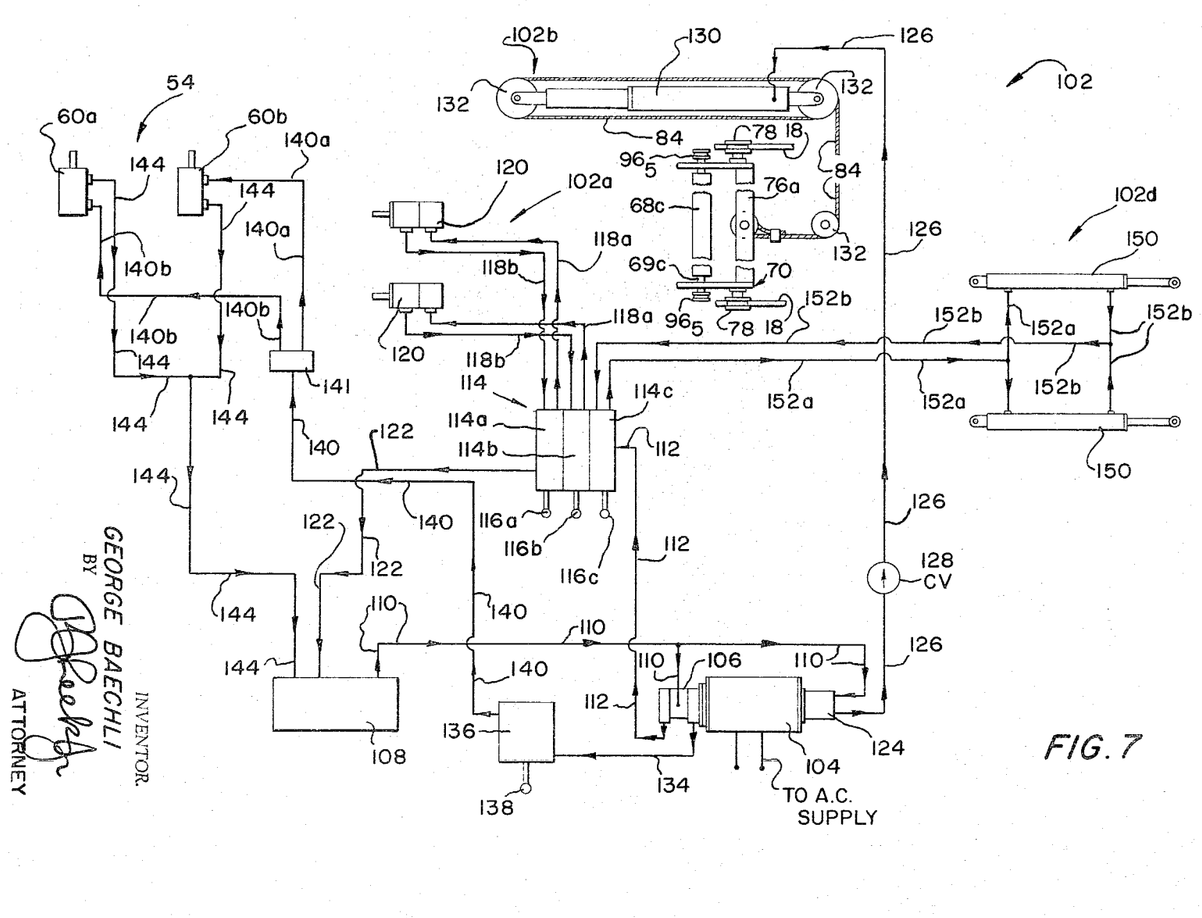
FIGS. 7 through 15 are diagrammatic views illustrating the operation of the conveyor.

The operation of the conveyor 10 is controlled by a drive means which is carried by the head section 12 and is designated generally at 102 in FIG. 7. The drive means 102, basically, comprises a traction or crawler drive means 102a for actuating the crawlers 26, a belt extension drive means 102b for varying the effective length of the endless conveyor belt 52, a conveyor-belt drive means 54 for longitudinally moving the endless conveyor belt 52, and a hopper elevating means 102d for pivoting the loading hopper 146.

The traction or crawler drive means 102a comprises a double pump 106 (FIGS. 1, 2, 7) which is driven by a motor 104 (FIGS. 1, 2, 7) to supply an operating fluid, such as hydraulic fluid, from a reservoir 108 (FIGS. 1, 2, 7) to the fluid motors 120 which drive the crawlers 26. The double pump 106 supplies hydraulic fluid to the fluid motors 120 through a fluid supply line 110 (FIG. 7) communicating the reservoir 108 with the double pump 106, and a pressure fluid line 112 (FIG. 7) connected between the double pump 106 and a valve bank 114 (FIG. 7). The valve bank 114 comprises a plurality of control valves 114a, 114b, and 114c which are actuatable by operating levers 116a, 116b, and 116c, respectively. The control valves 114a and 114b are operable to direct hydraulic fluid from the pressure fluid line 112 to the fluid inlet lines 118a for unidirection movement of the crawlers 26 and the fluid inlet lines 118b for reverse directional movement of the crawlers 26. The fluid return lines 122 return the hydraulic fluid from the valve bank 114 to the reservoir 108.

The belt extension drive means 102b comprises a constant pressure variable volume pump 124 (FIGS. 1, 2, 7) which is driven by the motor 104 to supply hydraulic fluid from the reservoir 108 to the tensioning jack 130 (FIGS. 1, 7) through the fluid supply line 110 and a fluid supply line 126 (FIG. 7) containing a check valve 128 (FIG. 7). The tensioning jack 130 carries a sheave 132 (FIG. 7) at each of its opposing ends; and the rope 84 which is connected to the carriage 70 is disposed circumferentially around the sheaves 132 to displace the carriage 70 during extension of the tensioning jack 130.

The conveyor-belt drive means 54 comprises the primary fluid motor 60a and the secondary fluid motor 60b which, as was previously described, drive the primary driving roll 56 and the secondary driving roll 58, respectively. Hydraulic fluid is supplied to the fluid motors 60a and 60b by the double pump 106 through the fluid supply line 134 (FIG. 7) which communicates with a fluid supply line 140 (FIG. 7) through a control valve 136 (FIG. 7) operable by a control lever 138 (FIG. 7). A valve 141 (FIG. 7) is interposed between the fluid supply line 140 and the divisional fluid lines 140a, 140b (FIG. 7) connected to the fluid motors 60a and 60b for controlling the flow of fluid to the fluid motors 60a and 60b. The fluid return lines 144 directly communicate the fluid motors 60a and 60b with the reservoir 108 for returning fluid from the fluid motors 60a and 60b.

The hopper elevating means 102d comprises the double-acting hydraulic jacks 150 which are connected intermediate the head section 12 and the loading hopper 146. Hydraulic fluid is directed to the double-acting hydraulic jacks 150 by the valve 114c which is controllable by the control lever 116c to supply fluid to the fluid supply lines 152a and 152b as required for the extension and retraction of the double-acting hydraulic jacks 150.

FIGS. 8 through 15 diagrammatically illustrate the operation of an extendible conveyor 10a which is constructed in accordance with the present invention. As shown in FIGS. 8 through 15, the conveyor 10a is disposed in a mine tunnel 158 between the mine supporting pillars 160 for conveying disintegrated material mined by a continuous miner 154 to the gathering belt 156 of the primary conveying system of the mine.

Figure 8:
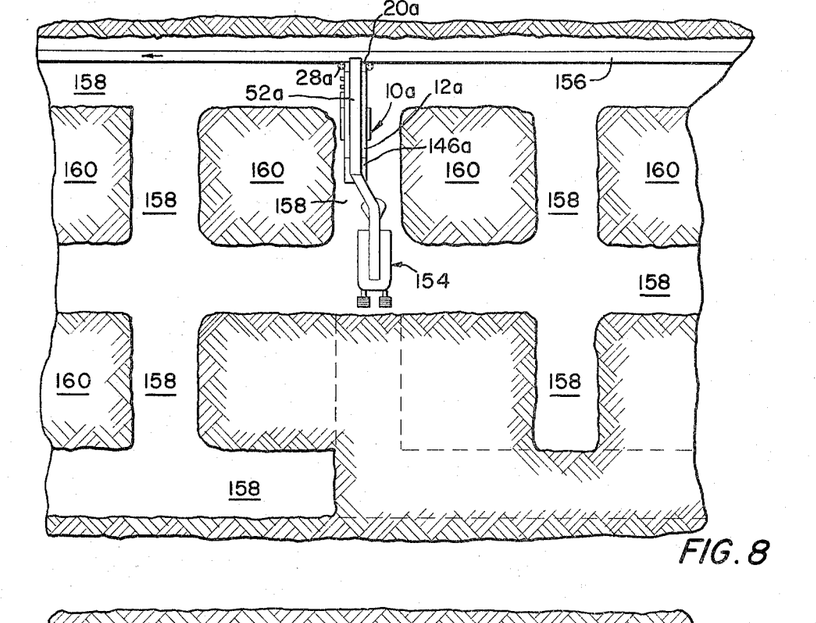

FIG. 8 illustrates the conveyor 10a in extreme retracted position for conveying disintegrated material mined by the continuous miner 154 adjacent the gathering belt 156 to the gathering belt 156. In this position, the conveyor 10a forms a unitary, rigid, compact conveying bridge intermediate the continuous miner 154 and the gathering belt 156.

Figure 9:
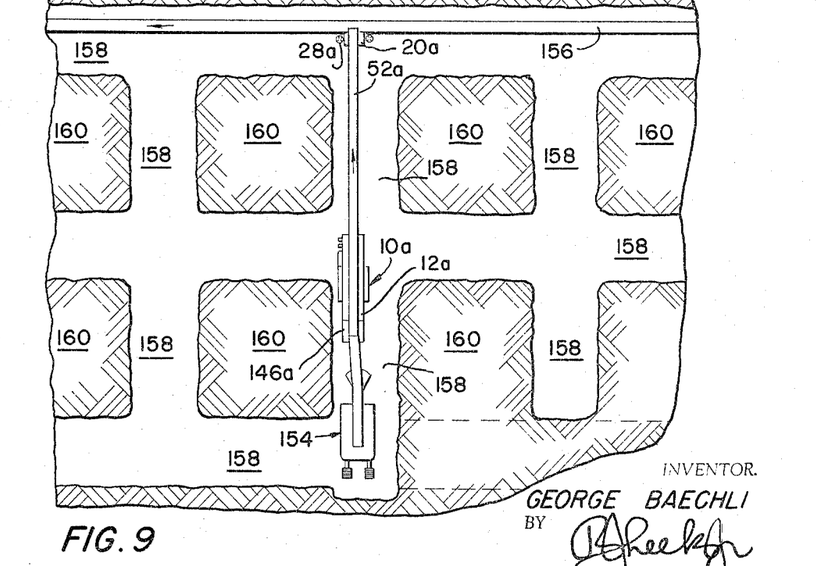

FIG. 9 illustrates the conveyor 10a after the continuous miner 154 has completed its mining operation adjacent the gathering belt 156 and is mining at a position remote therefrom. The tail section 20a of the conveyor 10a has been anchored by the anchor jacks 28a adjacent the gathering belt 156 and the head section 12a of the conveyor 10a has been longitudinally moved to follow the continuous miner 154. Thus, the conveyor 10a has been extended to increase the effective length of the endless conveyor belt 52a as necessitated by the movement of the continuous miner 154.

Figure 10:
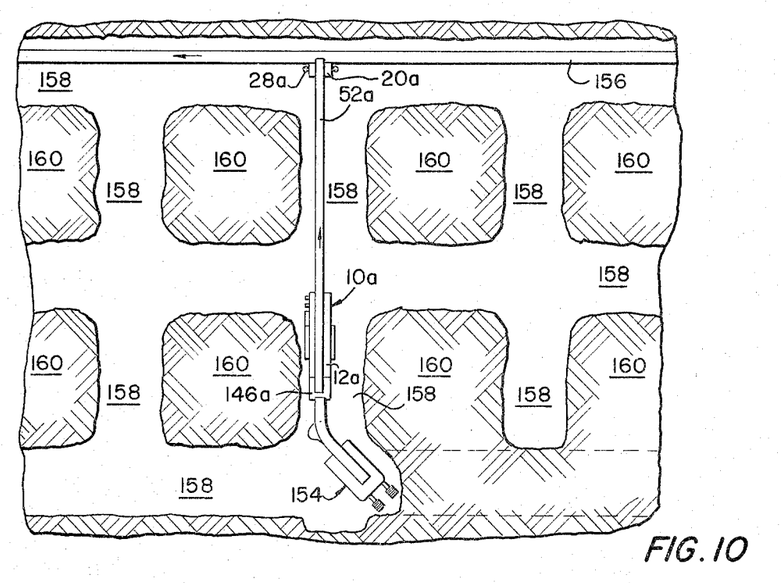
Figure 11:
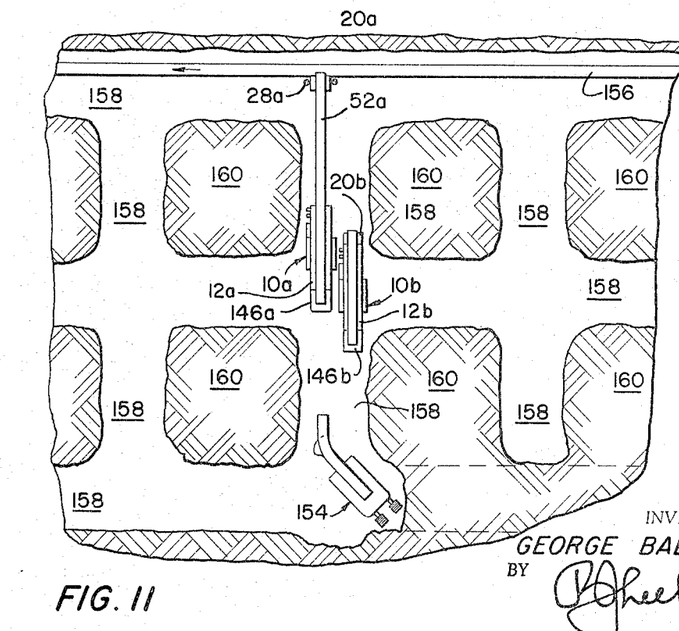
Figure 12:
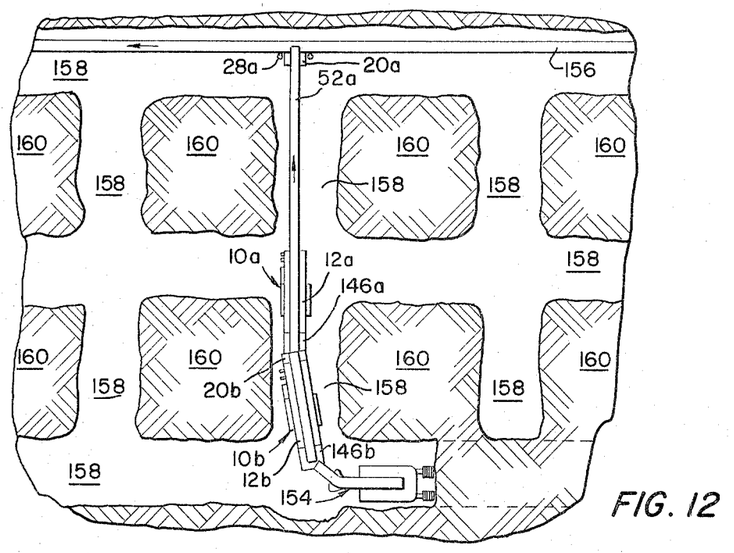

FIG. 10 illustrates the conveyor 10a in extended position with the continuous miner 154 preparing to mine a tunnel 158 substantially normal to the tunnel 158 containing the conveyor 10a. At this stage of the operation of the continuous miner 154, the conveyor 10a is sufficiently retracted, as shown in FIG. 11, to permit a second conveyor 10b to be interposed between the conveyor 10a and the continuous miner 154, as shown in FIG. 12. The second conveyor 10b receives disintegrated material mined by the continuous miner 154 in its loading hopper 146b, and directs such into the loading hopper 146a of the conveyor 10a from whence it is conveyed to the gathering belt 156 in the previously described manner.

Figure 13:
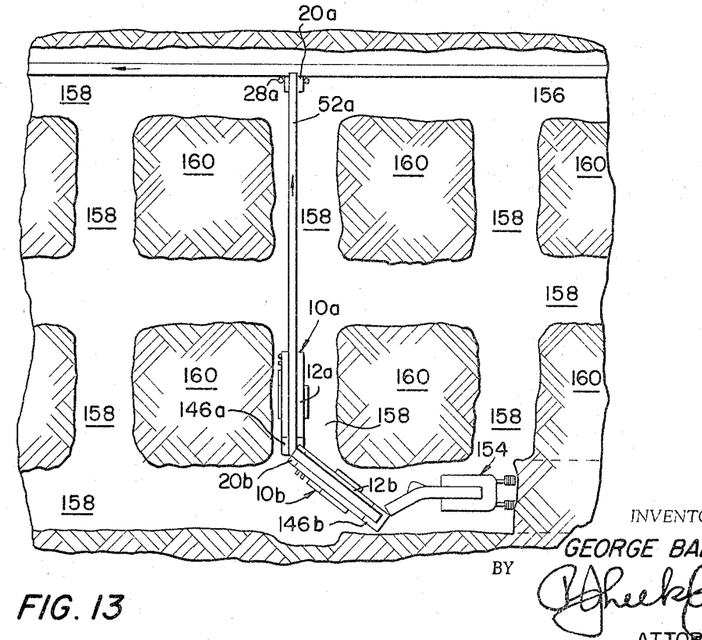

As illustrated in FIG. 13, the conveyor 10b is maintained in a retracted position wherein it forms a unitary, rigid, compact conveying bridge throughout its cornering to follow the continuous miner 154. The maintenance of this retracted position by the conveyor 10b ensures that the endless conveyor belt 52b thereof is properly aligned to receive disintegrated material from the continuous miner 154 and direct such to the conveyor 10a. The conveyor 10a is extended during the cornering of the conveyor 10b to facilitate the cornering thereof.

Figure 14:
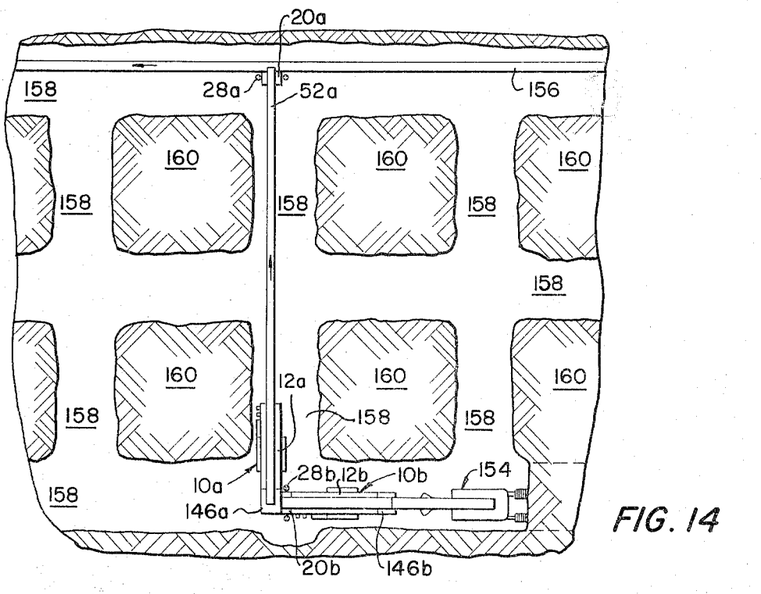
Figure 15:
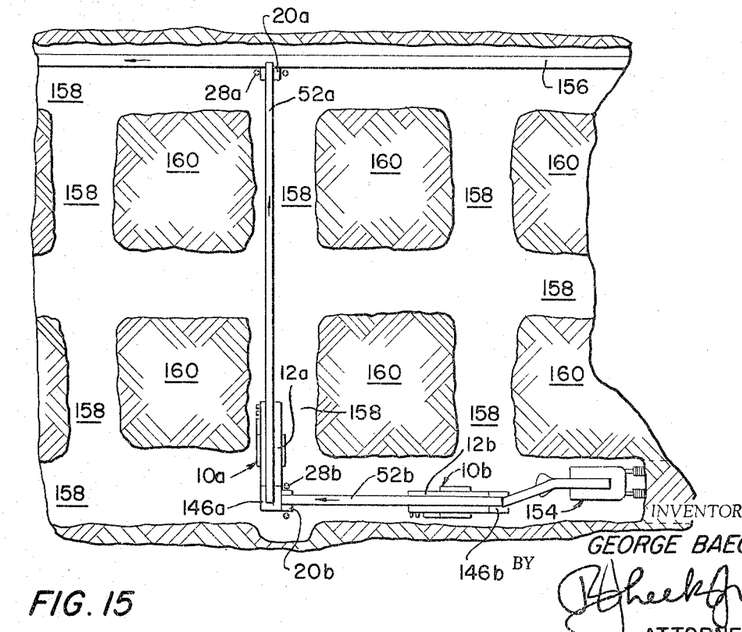

After the conveyor 10b has completed its cornering to follow the continuous miner 154, as shown in FIGS. 14 and 15, the tail section 20b thereof is anchored adjacent the loading hopper 146a of the conveyor 10a by the anchor jacks 28b. The head section 12b of the conveyor 10b may thereafter be longitudinally moved to vary the effective length of the endless conveyor belt 52b as necessitated by the movement of the continuous miner 154.

From the foregoing, it will be seen that I have provided new and improved means for accomplishing all of the objects and advantages of my invention. It will be understood, however, that the aforedescribed embodiment of my invention has been given as a preferred embodiment of the invention only and that changes may be made in the details of construction and arrangement of parts shown and described without departing from either the spirit or the scope of the invention.

Having thus described by invention, I claim:

1. An extendible belt conveyor for conveying disintegrated mined material, said conveyor comprising:

a supporting frame having a head section and a tail section detachably connected to said head section for conjoined movement with said head section;

traction means supporting said head section for effecting movement of said head section;

guide means upon said head section and said tail section for guiding an endless belt longitudinally on said head section and said tail section;

storage means upon said head section for storing a portion of an endless belt and varying the effective length of the endless belt upon movement of said head section with said tail section detached therefrom;

an endless belt longitudinally on said head section and said tail section for longitudinal movement thereon guided by said guide means and on said storage means to be variable in effective length upon movement of said head section with said tail section detached therefrom;

rope means extending longitudinally between said head section and said tail section connected to said head section and said tail section;

rope storage means carried by one of said head and tail sections for automatically adjusting the effective length of said rope means during movement of said head section with said tail section detached therefrom;

supporting means positioned by said rope means between said head and tail sections for supporting and guiding said endless belt intermediate said head section and said tail section when said head and tail sections are in spaced relationship;

drive means upon said head section for driving said traction means to move said head section and for driving said endless belt; and anchor means connected to said tail section for restricting movement of said tail section when such is detached from said head section.

2. An extendible belt conveyor according to claim 1, wherein said anchor means comprises means for locking said tail section in a fixed position.

3. An extendible belt conveyor for conveying disintegrated mined material, said conveyor comprising:

a supporting frame having a head section and a tail section which is secured to said head section for conjoined longitudinal movement therewith;

said tail section being detachable from said head section to allow longitudinal movement of said head section relative to said tail section such that said head section may be moved into longitudinally spaced relationship to said tail section;

traction means supporting said head section for longitudinally moving said head section with said tail section when the latter is secured to said head section and longitudinally moving said head section relative to said tail section when the latter is detached from said head section;

guide means carried by said head section and said tail section for guiding an endless belt longitudinally on said head section and said tail section;

storage means carried by said head section for storing a portion of an endless belt and varying the effective length of the endless belt upon movement of said head section relative to said tail section;

an endless belt longitudinally connecting said head section and said tail section for longitudinal movement thereto guided by said guide means and on said storage means to be variable in effective length upon movement of said head section relative to said tail section;

a rope extending longitudinally between said head section and said tail section connected to said head and tail sections;

rope storage means carried by said head section for automatically adjusting the effective length of said rope upon movement of said head section relative to said tail section;

a ground mounted, supporting stand positioned by said rope between said head section and said tail section for supporting and guiding said endless belt intermediate said head and tail sections when such are in longitudinally spaced relationship;

drive means carried by said head section for driving said traction means to move said head section and for longitudinally moving said endless belt; and anchor means connected to said tail section for restricting movement of said tail section when such is detached from said head section.

4. An extendible belt conveyor according to claim 3, wherein said anchor means comprises means for locking said tail section in a fixed position.

5. An extendible belt conveyor according to claim 3, wherein said anchor means comprises means for supporting said tail section when the latter is detached from said head section.

6. An extendible belt conveyor according to claim 3, wherein said anchor means comprises a plurality of vertically extending supporting posts for supporting said tail section and securing the latter in a fixed position when it is detached from said head section.

7. An extendible belt conveyor according to claim 6, wherein said supporting posts are detachably connected to said tail section.

8. An extendible belt conveyor according to claim 4, wherein said tail section is detachably carried by said head section.

9. An extendible belt conveyor according to claim 4, wherein said tail section is detachably carried by said head section, and said head and tail sections form a unitary, rigid supporting frame with said tail section carried by said head section.

10. An extendible belt conveyor according to claim 4, wherein said head section pivotally carries a hopper for receiving disintegrated material and directing such to said endless belt.

11. An extendible belt conveyor according to claim 10, wherein said tail section and said hopper are carried by longitudinally opposing ends of said head section, and said endless belt extends into said hopper to receive disintegrated material therefrom.

12. An extendible belt conveyor according to claim 4, wherein the drive means for longitudinally moving said endless belt is operatively connected to said endless belt such that the slack side thereof conveys disintegrated material from said head section to said tail section.

13. An extendible belt conveyor according to claim 4, wherein the drive means for longitudinally moving said endless belt is operatively connected to said endless belt in spaced relationship to said tail section such that the slack side of said endless belt conveys disintegrated material from said head section to said tail section.

References Cited by the Examiner

UNITED STATES PATENTS

| | | | |
|---|---|---|---|
| 2,576,217 | 11/1951 | Eggleston | 198—139 |
| 2,858,933 | 11/1958 | Hardy | 198—139 |
| 2,862,604 | 12/1958 | Craggs | 198—129 |
| 2,863,553 | 12/1958 | Nordquist | 198—139 |
| 2,920,747 | 1/1960 | Barrett | 198—139 |
| 3,039,596 | 6/1962 | Poundstone | 198—139 |

EVON C. BLUNK, *Primary Examiner.*

ROBERT E. AEGERTER, *Examiner.*